Patented Dec. 11, 1951

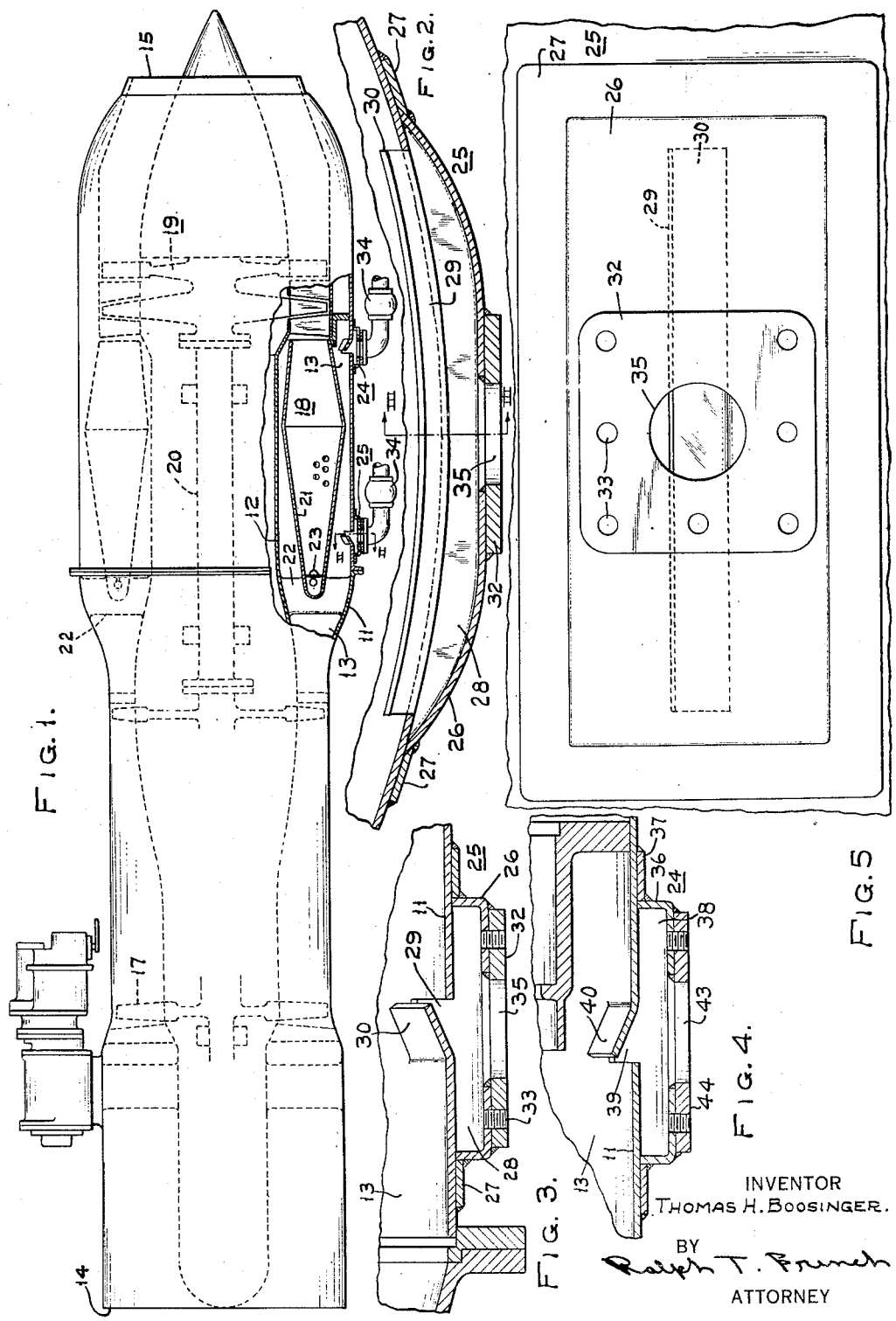

2,578,501

UNITED STATES PATENT OFFICE 2,578,501

FUEL TRAP FOR COMBUSTION APPARATUS OF GAS TURBINE ENGINES

Thomas H. Boosinger, Glenolden, Pa., assignor to Westinghouse Electric Corporation, East Pittsburgh, Pa., a corporation of Pennsylvania Application July 21, 1948, Serial No. 39,840

4 Claims. (Cl. 60—39.69)

This invention relates to gas turbine power plants and more particularly to an aviation gas turbine engine utilizing liquid fuel.

In the course of the service life of a gas turbine power plant, which in a typical form may comprise a cylindrical casing structure housing, an air compressor, combustion apparatus in which combustion of liquid fuel is supported by air from the compressor, and a turbine driven by the resultant motive fluid, quantities of unburned fuel may occasionally escape from the combustion apparatus and accumulate within the casing structure. Such an accumulation of fuel is undesirable from an operational standpoint, particularly during starting of the engine, and may present a considerable fire hazard when the engine is mounted in an aircraft.

It is an object of the present invention to provide means for eliminating any fuel deposits that may tend to accumulate in such a power plant.

Another object of the invention is the provision of improved gas turbine apparatus including a combustion basket structure mounted within a cylindrical casing structure, and fuel trap means constructed and arranged to collect and expedite discharge of such fuel as may escape from the combustion basket, before it can flow into the compressor or turbine.

These and other objects are effected by my invention as will be apparent from the following description and claims taken in connection with the accompanying drawing, forming a part of this application, in which:

Fig. 1 is an elevational schematic view, partly in section, of a typical aviation gas turbine power plant equipped with fuel trap means embodying the invention;

Fig. 2 is a fragmentary sectional view, in enlarged detail, taken substantially along the line II—II of Fig. 1;

Fig. 3 is a fragmentary sectional view taken substantially along the line III—III of Fig 2;

Fig. 4 is a fragmentary sectional view of the rearwardly disposed fuel trap constituting a companion of that shown in Fig. 3; and Fig. 5 is a fragmentary view of the bottom of the fuel trap structure shown in Fig. 2.

The aviation gas turbine power plant illustrated in Fig. 1 of the drawing comprises a cylindrical casing structure 11 having mounted therein a sectional core structure 12 which together with the casing structure provides an annular passageway 13 that extends longitudinally through the plant from a forwardly directed air intake opening 14 to a rearwardly disposed jet discharge or nozzle 15. The essential elements of the power plant are arranged in alignment along the axis thereof, in order to present minimum frontal area and drag incident to operation of the aircraft with which the plant is equipped. These elements include an axial flow compressor 17, combustion apparatus generally indicated at 18 and a turbine 19, the rotor of which is operatively connected to the rotor of the compressor through the medium of an axially arranged shaft 20. The combustion apparatus 18 comprises an annular basket structure 21 having suitably apertured walls formed of sheet metal, the basket structure being suitably supported within the passage 13 by radially arranged struts 22 secured to the casing structure. Suitable means for supplying liquid fuel to the upstream portion of the combustion basket 21 may be associated therewith, such as nozzles 23.

In accordance with the well known principle of operation of a gas turbine, air entering the intake opening 14 is compressed by the compressor 17 and supplied to the combustion apparatus 18, where fuel injected through the nozzles 23 is burned to provide heated motive fluid, which is then expanded through the turbine 19 and discharged by way of the nozzle 15, usually in the form of a jet establishing a propulsive thrust. Under certain service conditions, some of the liquid fuel atomized within the combustion basket 21 may pass outwardly thereof through the apertures provided in the basket walls, and may condense on the interior wall of the casing structure 11 to form a pool of fuel below the combustion basket. In order to eliminate such an accumulation of fuel and thereby to prevent undesired burning thereof outwardly of the normal combustion zone, a pair of fuel trap devices 25 and 24 are associated with the outer wall of the casing structure 11.

As shown in Figs. 2 and 3 of the drawing, the fuel trap device 25 comprises a curved or bowl-shaped wall member 26, preferably formed of sheet metal, which is formed to fit the lower surface of the casing structure 11, and which may be suitably secured thereto by means of metal strips or flanges 27 spot welded to the outer surface of the structure and engaging the marginal portions of the wall member. The wall member 26 and the adjacent portion of the casing structure 11 define a fuel receiving or trap chamber 28, which communicates with the passageway 13 of the engine by way of a transversely disposed slot 29, which is formed in the casing structure 11 near the forward or upstream end of the basket structure 21. As shown in Fig. 2, the slot 29 extends through a substantial arc or segment of the casing circumference to catch and divert any fuel accumulating in the casing structure notwithstanding occasional tilting of the engine about its axis. The slot 29 is preferably formed by cutting the sheet metal casing structure 11 to provide a flange or baffle 30, which is then bent inwardly about the forward edge thereof to provide a means for diverting through the slot 29 any fuel which may tend to flow in an upstream direction or toward the compressor of the engine. The lower portion of the wall member 26 is flattened and carries a bolting plate 32, which may be provided with bores 33 for facilitating attachment thereto of suitable drain valves or other drainage means 34 (see Fig. 1). Both the wall member 26 and the bolting plate 32 are provided with a central opening 35 through which liquid fuel may flow from the trap chamber 28 to the aforesaid drainage means.

The rearwardly disposed fuel trap device 24 is similar in construction to that already described, and is located near the downstream end of the basket structure 21, as best shown in Fig. 1 of the drawing. Referring to Fig. 4, the fuel trap device 24 includes a bowl-shaped wall member 36 which is secured to the casing structure 11 by means of strips or flanges 37, and which forms a fuel receiving chamber 38 communicating with the passageway 13 by way of a transversely disposed slot 39 formed in the outer wall of the casing structure. The slot 39 is partially closed by an upwardly inclined flange 40, the rearward or downstream side of which is integral with the casing structure 11. The flange 40 is thus constructed and arranged to catch any fuel tending to flow rearwardly along the interior surface of the casing structure 11, and to divert such fuel through the slot 39 into the receiving chamber 38 of the trap device 24. The wall member 36 has formed therein a central discharge opening 43 and carries an apertured bolting plate 44 for enabling the drainage means 34 to be attached thereto.

From the foregoing it will be seen that the invention provides an efficient fuel trap apparatus of lightweight and space saving construction, which may readily be installed either in existing engines or in power plants of advanced design, for insuring positive discharge of excess fuel with a minimum risk of air leakage or formation of hot spots in the region of the combustion apparatus while the unit is in operation.

While the invention has been shown in but one form, it will be obvious to those skilled in the art that it is not so limited, but is susceptible of various changes and modifications without departing from the spirit thereof.

What is claimed is:

1. In a gas turbine power plant having a cylindrical sheet metal casing structure containing a forwardly disposed compressor, a rearwardly disposed turbine and fuel combustion apparatus interposed therebetween, the combination therewith of means for preventing access to either said compressor or said turbine of fluid deposited in said casing structure, said means comprising spaced transverse slots formed in the outer casing wall beneath the opposite ends of said combustion apparatus, each of said slots having an inwardly inclined baffle formed along one edge thereof for preventing flow of fluid therepast toward the adjacent end of the combustion apparatus, and an arcuate fluid trap conformed to and mounted on said outer wall of the said casing structure beneath each of said slots, each of said traps having a receiving chamber from which accumulated fluid can be discharged without the creation of hot spots in said casing structure.

2. In a gas turbine power plant having a cylindrical sheet metal casing structure containing a forwardly disposed compressor, a rearwardly disposed turbine and fuel combustion apparatus interposed therebetween, the combination therewith of means for preventing access to either said compressor or said turbine of fluid deposited in said casing structure, said means comprising a pair of transverse arcuate flanges formed in the wall of said casing and providing slots disposed near the opposite ends of said combustion apparatus, each of said flanges being bent inwardly to catch and divert through the adjacent slot any fluid accumulated in the casing structure between said two flanges, arcuate trap structures formed of sheet metal and welded to said casing structure adjacent the respective slots, each trap structure forming a fluid receiving chamber communicating with the corresponding slot and having a central discharge opening, and an apertured bolting plate welded to the outer surface of each of said trap structures for supporting drainage means.

3. In a gas turbine power plant having a cylindrical sheet metal casing structure containing a concentric annular combustion basket interposed between a forwardly disposed compressor and a rearwardly disposed turbine, means for effecting discharge of excess fuel deposited in said casing structure comprising a transverse slot having an inwardly bent arcuate flap formed upstream thereof in the bottom wall of said cylindrical casing structure adjacent the upstream end of said combustion basket, a similar slot transversely formed in said casing structure and having an inwardly bent arcuate flap disposed downstream thereof beneath the downstream end of said combustion chamber, each of said slots extending through a substantial segment of the casing circumference to catch and divert any fuel accumulating in said casing structure between said slots notwithstanding the occasional tilting of said power plant under service conditions.

4. Apparatus of the character set forth in claim 3, including an arcuate trap member secured to the casing structure outwardly of each slot for reinforcing said casing structure, each trap member providing a fuel discharge chamber sufficiently remote from the combustion zone to minimize creation of hot spots in said power plant.

THOMAS H. BOOSINGER.

REFERENCES CITED

The following references are of record in the file of this patent:

UNITED STATES PATENTS

| Number | Name | Date |
| --- | --- | --- |
| 1,625,997 | Grönkwist | Apr. 26, 1927 |
| 2,446,013 | Kuyper | July 27, 1948 |